United States Patent
Nyflött et al.

(10) Patent No.: US 11,486,095 B2
(45) Date of Patent: Nov. 1, 2022

(54) PAPERBOARD FOR PACKAGING OF LIQUID AND/OR FROZEN FOOD

(71) Applicant: Stora Enso OYJ, Helsinki (FI)

(72) Inventors: Åsa Nyflött, Karlstad (SE); Chris Bonnerup, Floda (SE); Magnus Ekberg, Fors (SE); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 63 days.

(21) Appl. No.: 16/958,249

(22) PCT Filed: Dec. 20, 2018

(86) PCT No.: PCT/IB2018/060429
§ 371 (c)(1),
(2) Date: Jun. 26, 2020

(87) PCT Pub. No.: WO2019/130179
PCT Pub. Date: Jul. 4, 2019

(65) Prior Publication Data
US 2020/0332469 A1    Oct. 22, 2020

(30) Foreign Application Priority Data

Dec. 28, 2017 (SE) .................... 1751664-2

(51) Int. Cl.
| | | |
|---|---|---|
| *D21H 21/16* | (2006.01) | |
| *D21H 19/22* | (2006.01) | |
| *D21H 19/38* | (2006.01) | |
| *D21H 19/40* | (2006.01) | |
| *D21H 19/56* | (2006.01) | |
| *D21H 19/82* | (2006.01) | |
| *D21H 19/84* | (2006.01) | |
| *D21H 27/10* | (2006.01) | |

(52) U.S. Cl.
CPC ............. *D21H 21/16* (2013.01); *D21H 19/22* (2013.01); *D21H 19/385* (2013.01); *D21H 19/40* (2013.01); *D21H 19/56* (2013.01); *D21H 19/82* (2013.01); *D21H 19/84* (2013.01); *D21H 27/10* (2013.01)

(58) Field of Classification Search
CPC ........ D21H 19/48; D21H 21/16; D21H 27/10; D21H 19/40; D21H 19/385; D21H 19/82; D21H 19/84; D21H 19/56; D21H 19/22
USPC ........................................................ 162/137
See application file for complete search history.

(56) References Cited

U.S. PATENT DOCUMENTS

| | | | |
|---|---|---|---|
| 6,531,196 B1 * | 3/2003 | Aho ................. | B65D 65/42 427/391 |
| 2003/0152724 A1 | 8/2003 | Swoboda et al. | |
| 2004/0161594 A1 | 8/2004 | Joyce et al. | |
| 2008/0241483 A1 | 10/2008 | Verhoeven et al. | |
| 2010/0310883 A1 | 12/2010 | Brungardt | |
| 2011/0046284 A1 | 2/2011 | Berube et al. | |
| 2011/0262745 A1 | 10/2011 | Ronka | |
| 2013/0225744 A1 | 8/2013 | Iyer et al. | |
| 2014/0300026 A1 | 10/2014 | Taccolini | |
| 2015/0111011 A1 | 4/2015 | Hoekstra et al. | |
| 2016/0168799 A1 | 6/2016 | Constant | |
| 2017/0030021 A1 | 2/2017 | Hellstén et al. | |

FOREIGN PATENT DOCUMENTS

| | | |
|---|---|---|
| CN | 102459758 A | 5/2012 |
| EP | 2358942 | 5/2010 |
| EP | 2777934 A1 | 9/2014 |
| NZ | 532985 A | 4/2008 |
| WO | 9854410 | 12/1998 |
| WO | 02053838 A1 | 7/2002 |
| WO | 2006007239 A2 | 1/2006 |
| WO | 2010052571 | 5/2010 |
| WO | 2014005697 | 1/2014 |
| WO | 2015155413 A1 | 10/2015 |
| WO | 2016170229 A1 | 10/2016 |
| WO | 2017073537 A1 | 5/2017 |

* cited by examiner

*Primary Examiner* — Mark Halpern
(74) *Attorney, Agent, or Firm* — Greer, Burns & Crain, Ltd.

(57) ABSTRACT

The present invention discloses a paperboard for packaging of liquid and frozen food, comprising a dispersion coating as the only barrier layer on its outside/print side. It has surprisingly been found that a dispersion coating comprising latex and pigment applied on the outside/print side of a paperboard for liquid and/or frozen food may serve as the only barrier against moisture arising from condensation.

19 Claims, 1 Drawing Sheet

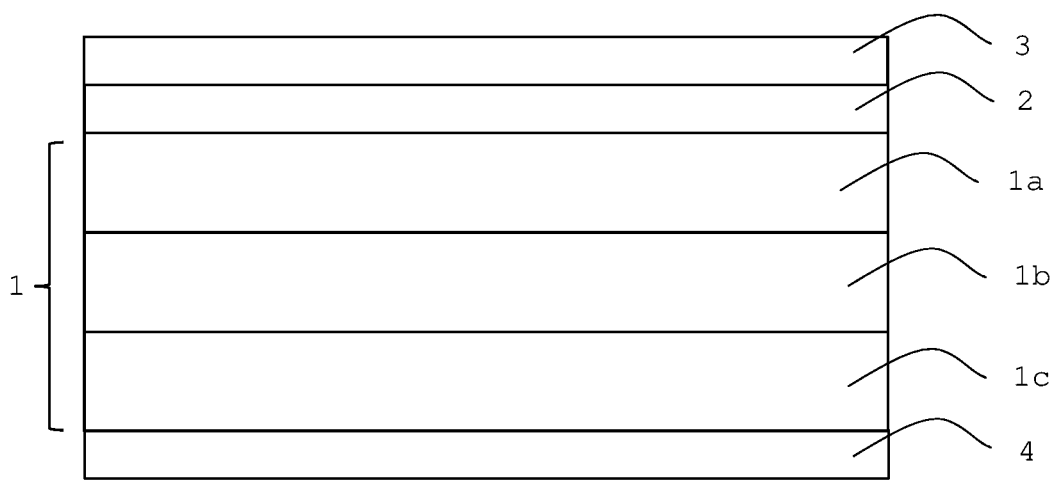

PAPERBOARD FOR PACKAGING OF LIQUID AND/OR FROZEN FOOD

This application is a U.S. National Phase under 35 U.S.C. § 371 of International Application No. PCT/IB2018/060429, filed Dec. 20, 2018, which claims priority under 35 U.S.C. §§ 119 and 365 to Swedish Application No. 1751664-2, filed Dec. 28, 2017.

FIELD OF THE INVENTION

The present invention relates to a paperboard for packaging of liquid and/or frozen food, a method to produce such a paperboard and a liquid and/or frozen food packaging comprising the paperboard.

BACKGROUND

Fiber based material used in packages or cups for liquids or frozen food is usually provided with barrier coatings both on the inside (facing the packed item) and on the outside (print-side). The barrier coating applied on the inside makes the material resistant against e.g. liquids, grease and/or aroma and enables it to withstand the influence of the packed item on the packing material. The barrier coating should also be heat-sealable. The barrier on the outside is applied to protect the packed item from the surrounding, especially from water vapor and condensation that is formed on the surface due to temperature fluctuations or temperature differences between cup outside vs cup inside (when filled).

Barriers are normally created by coating the fiber based substrate with a composition which gives the substrate barrier properties. The most commonly used materials when forming a barrier on a fiber based product, are polyolefins, such as polyethylene (PE) or polypropylene (PP). Today, also bio-based versions thereof are used including other bio-based polymers such as PLA. Liquid packaging board is usually provided with polymer coating on both sides and oftentimes with an additional aluminum coating layer on the inside. Paperboard intended for cups is oftentimes provided with a polyolefin coating to provide a barrier both on the inside towards the liquid content and on the outer/print side to provide a barrier against moisture arising from condensation.

The polymers can for example be laminated or extrusion coated to the fiber based product. Currently, most of the barrier coatings are manufactured with extrusion coating techniques and hence made off-line in a separate coating unit. This increases the flexibility of the paper or board machine since different operation schedules can be used on the paper or board machine and the extrusion coating unit. However, one disadvantage is that this is not cost-efficient since it requires extra handling of the reels and an extra converting step. In addition, such coatings might not be biodegradable or recyclable. The extrusion coated polymers are hard to disintegrate and re-use as part of a broke handling in paper and paperboard making. Polyolefin coatings further puts limitations on the printability of the surface and are not compatible with all kind of inks.

Environmental concerns and increasing oil prices has further created a renewed interest in barriers from non-fossil-based materials. This has increased the interest for dispersion barrier coating techniques.

In the prior art, dispersion barrier coatings have been proposed. Normally, these coatings comprise fillers or pigments to a quite low amount, primarily in order to ensure good convertibility i.e. avoid cracking and to ensure that a good moisture barrier is obtained. EP2358942 discloses a paperboard coated with a first and a second barrier coating layers consisting of an aqueous polymer dispersion comprising from about 70-90 wt % of a polymer emulsion and 10-30 wt % of a pigment. Such a coated surface is however not optimized for printing. WO2015155413 discloses a coated food cardboard, with a dispersion barrier coating applied between the board layer and a pigment coating layer. WO9854410 discloses a coated board comprising a talc containing polymeric dispersion barrier layer. Talc does however not give rise to desired optical properties to provide a high quality, printable outer surface.

There remains a need for a dispersion coated paperboard for liquid and/or frozen food, which provides a barrier towards moisture arising from condensation and yet good optical properties.

SUMMARY OF THE INVENTION

It has surprisingly been found that a dispersion coating comprising latex and pigment applied on the outside/print side of a paperboard for liquid and/or frozen food may serve as a sufficiently efficient barrier against moisture arising from condensation.

In a first aspect, the invention discloses a paperboard for packaging of liquid and/or frozen food, comprising
  a fiber based substrate, which comprises a first and a second side, and
  at least one first dispersion barrier layer applied on said first side, which dispersion barrier layer forms a printing surface, wherein said dispersion barrier layer comprises latex to an amount of between 30-50 weight % and a pigment chosen from the group of clay calcium carbonate to an amount of 50-70 weight %, all percentages calculated on the dry weight of said dispersion coating.

It has been shown that such a dispersion barrier layer provides both high barrier properties against moisture arising from condensation and water vapor. In addition, the barrier layer provides the paperboard with good optical properties resulting in a surface suitable for printing. The invention enables a dispersion coating to be applied as the only coating on the outside/print-side of a liquid/frozen food packaging material, which enables savings in production costs and reduces the carbon footprint of the material. The dispersion barrier coating may further provide a barrier against grease, oxygen or other gases. In this context, a "printing surface" is meant to define a surface adapted to be printed. Thus the at least one barrier layer forming a printing surface forms the outermost layer of the paperboard.

The formed dispersion coated paperboard exhibits both a good barrier against liquids, especially moisture arising from condensation, as well as excellent optical properties, which makes the surface suitable for printing. In one embodiment, the dispersion coated paperboard exhibits a brightness of at least 70%, preferably at least 80%, and a Water Vapor Transfer Rate (WVTR) of less than 10 $g/m^2/24$ h, preferably less than 5 $g/m^2/24$ h). The dispersion coated paperboard may further exhibit a water absorption rate between 1-10 g/m2, preferably between 1-5, as measured using COBB 3600.

In a second aspect, the invention defines a method to produce a paperboard comprising the steps of:
  providing a fiber-based substrate comprising at least two plies and having a first and a second side,
  applying at least one dispersion barrier layer on the first side, forming a dispersion coated substrate, drying said dispersion coated substrate, and
wherein the at least one dispersion barrier layer comprises latex in an amount of between 30-50 weight % and a pigment chosen from the group of clay and calcium carbonate in an amount of between 50-70 weight %, all percentages calculated on the dry weight of said dispersion barrier layer.

In a third aspect, the invention defines a liquid and/or frozen food packaging comprising the above described paperboard. The packaging is suitable for both cold and warm liquids.

DETAILED DESCRIPTION

"Fiber based substrate" as used herein refers to an untreated paper or paperboard substrate comprising cellulose fibers. A typical paperboard substrate used for packaging material comprises at least one ply, preferably several plies. The paperboard substrate is preferably a multilayer packaging paperboard, comprising at least two plies, a back ply and a top ply. The paperboard substrate may comprise for example a top and a back ply and at least one middle ply. The paperboard substrate may have a basis weight of at least 150 gsm, preferably at least 200 gsm. Such a multilayer paperboard is particularly suitable for liquid and/or food packaging.

The term "latex" as used herein refers to an aqueous suspension of polymer particles, which can be natural polymers, synthetic polymers, synthetic polymers derived from biomasses or combination thereof.

"Dispersion coating" which is used herein to create a barrier relates to a coating technique in which an aqueous dispersion comprising fine polymer particles, such as latex, is applied to the surface of a fiber-based substrate to form a solid, substantially non-porous film after drying. A dispersion barrier layer is formed by dispersion coating.

The Brightness as expressed herein is measured in accordance with ISO 2470.

The Water Vapor Transfer Rate as expressed herein is measured in accordance with ASTM F1249 with Mocon instrument at a temperature of 23° C. and at 50% RH.

The Water absorption rate expressed herein is measured using COBB 3600 in accordance with SCAN-P 12:64.

The invention relates to a paperboard for packaging of liquid and/or frozen food having a first and a second side (forming a first and a second surface). The paperboard is provided with a first dispersion barrier layer on its first side, forming a printing surface. Said at least one dispersion barrier layer comprises latex to an amount of between 30-50 weight %, preferably 30-40 weight % and a pigment, chosen from the group of clay (preferably kaolin clay) and calcium carbonate, to an amount of 50-70 weight %, preferably 60-70 weight %, all percentages calculated on the dry weight of said dispersion barrier layer.

The present inventors have found that it is possible to use a dispersion coating on the outer/print side of a packaging board as the only barrier against moisture arising from condensation. This provides an environmental friendly (recyclable) and re-pulpable coating on said print side. The recycling of a fiber based product which has been dispersion coated is facilitated, both in the paper making process and after recycled in the end of the life cycle. It is much easier to recycle a dispersion coating which is added to a paper or board compared to a laminated or extrusion coated barrier.

The latex used in the first and/or second dispersion barrier layer may be selected from the group comprising styrene-butadiene latex, styrene-acrylate latex, acrylate latex, vinyl-acetate latex, acrylate latex, vinyl acetate latex, vinyl acetate-acrylate latex, styrene-butadiene-acrylonitrile latex, styrene-acrylate-acrylonitrile latex, styrene-butadiene-acrylate-acrylonitrile latex, styrene-maleic anhydride latex, styrene-acrylate-maleic anhydride latex, or mixture of these latexes. The latex is preferably a styrene-butadiene (SB) latex or a styrene-acrylate (SA) latex, acrylate latex, vinyl acetate latex, or vinyl acetat-acrylate latex, or mixture of these latexes. The latex can be biobased, i.e. derived from biomass, such as biobased styrene-acrylate or styrene-butadiene latex. Biobased latex can provide similar performance, and provides improved carbon footprint.

In addition to latex and pigments, the dispersion barrier layer or layers may further comprise a small amount of additives, such as between 0.1-5 wt %, or 0.1-1, or 1-5 wt %, as calculated on the dry weight of said dispersion barrier layer. Additives may include thickening agents, defoaming or antifoaming agents, dispersing aids, additional pigments, cross-linkers, slip additives, fillers, release agents, preservatives and antiblocking agents.

In accordance with one embodiment of the invention, the at least one dispersion coating layer comprises a cross-linker. Cross-linker as used herein is meant to define an agent that reacts with carboxyl- and/or hydroxyl groups. The cross-linker is preferably chosen from the group of Ammonium Zirconium Carbonate (AZC), Potassium Zirconium Carbonate, Potassium Zirconium Acetate (Methylated) melamine formaldehyde resin or (methylated) urea formaldehyde resin, Glyoxal, Imidazoline derivatives, dialdehyde polysaccharides and combinations thereof. The cross-linker is preferably added in an amount of between 0.1-5 wt %, or between 1-2 wt % as calculated on the dry weight of said dispersion barrier layer. The cross-linker further improves the barrier properties e.g. by providing a denser and less porous coating layer. In addition, the smoothness of the surface is improved. In one preferred embodiment, the cross linker is chosen from the group of dialdehyde polysaccharides such as dialdehyde cellulose (DAC) and dialdehyde starch.

The fiber based substrate may be surface sized on said first side prior to the application of the dispersion barrier layer or layers. The surface size may comprise or consist of modified starches or comprise surface sizing agents such as acrylic co-polymers. This enhances the barrier properties of the dispersion coating even further.

In one preferred embodiment of the invention, the paperboard further comprises polymer layer or layers on the second, opposite side of the fiber based substrate in relation to the dispersion barrier layer. In addition to providing liquid barrier to the inner side of thereof formed cup or packaging, such a structure further provides high stiffness to the paperboard. The application of such a polymer layer may e.g. increase the stiffness of the paperboard with between 5-10%. The inventive structure gives the papermaker the possibility to reduce the fiber amount in the paperboard but still achieve a high stiffness—thus enables source reduction. This polymer layer may be extrusion coated or laminated onto the second side of the substrate. Preferably, the polymer is a polyolefin such as polyethylene (PE) or polypropylene (PP), or alternatively polyethylene terephthalate (PET), ethylene vinyl alcohol (EVOH), ethylene vinyl acetate (EVA) and/or polylactic acid (PLA). The polymer is preferably derived from biomass.

In one embodiment, polymer layer is formed from foamed polymer, such as foamed polyethylene. Thus, in this embodiment the polymer (e.g. polyethylene) is applied on the second, inner side of the paperboard by foam coating. The use of foamed polymer coating improves the stiffness of the board even further.

According to one embodiment, the pigment in the first and the optional second dispersion coating layer is clay, preferably kaolin clay. The first and optional second dispersion barrier layer/s can thus comprise latex in an amount of 30-50 weight %, or 35-45 weight %, and clay in an amount of 50-70 weight %, or 55-65 weight %. A dispersion barrier coating comprising latex and clay in the said proportions gives rise to an excellent coverage of the surface which increase the barrier properties of the coating even further.

In another embodiment, the pigment in the first and the optional second dispersion coating layer is calcium carbonate. The dispersion coating can thus comprise latex in an amount of 30-50 weight % and calcium carbonate in an amount of 50-70 weight %. A dispersion barrier coating comprising latex and calcium carbonate in the said proportions gives rise to good optical properties, such as a high brightness.

The paperboard may comprise a first and a second dispersion barrier layer. In this embodiment, said first dispersion barrier layer may be applied directly onto the first side of the untreated or surface sized paperboard substrate and said second dispersion barrier layer may be applied on said first dispersion barrier layer, whereby said second dispersion barrier layer forms the printing surface. Two layer coating provides better coverage of the surface and thereby enhanced barrier properties. Said second dispersion barrier layer may comprise latex in an amount of 30-50 weight %, or 30-40 weight % and a pigment in an amount of 50-70 weight %, 60-70 weight %, while said first dispersion layer may comprise latex to 70-100 wt % and pigments to 30-0 wt % and optimally additives to 1-5 wt % as calculated on the dry weight of said layer. In other embodiments said first dispersion barrier layer may, like the second dispersion barrier layer, comprise latex in an amount of 30-50 weight % or 35-45 weight % and a pigment in an amount of 50-70 weight %, or 55-65 weight %.

According to one preferred embodiment, the first dispersion layer comprises latex and clay and the second dispersion barrier layer comprises latex and calcium carbonate. In this way, the dispersion coating combines the good coverage property of clay and the high brightness of calcium carbonate in an optimal way. When having the different pigments in different layers, this effect is even further enhanced. The first dispersion layer, comprising latex and clay, may be formed directly on and in contact with the board substrate (or the surface sized board substrate) and the second dispersion layer, comprising latex and calcium carbonate may be formed as a second layer onto said first layer, which first layer forms the printing surface.

According to one embodiment of the present invention, one dispersion layer is applied on the first side of the paperboard, which dispersion layer is the only barrier layer applied on the first side (print-side) of the paperboard and which dispersion layer forms the printing surface. Thus, in this embodiment, the un-treated or surface sized paperboard, on its print side is applied with one or two barrier layer/s directly onto the first side/surface of the untreated or surface sized paperboard, which barrier layer/s form a printing surface.

The dispersion coated paperboard of the invention may exhibit a brightness of at least 70%, preferably at least 80%, and a Water Vapor Transfer Rate (WVTR) of less than 10 g/m2 per day (ASTM F1249). The dispersion coated paperboard may further exhibit a water absorption rate between 1-6 g/m2, preferably between 1-5, as measured using COBB 3600. The paperboard may further exhibit a contact angle of at least 80, preferably at least 90, 100 or 110 degrees [SCAN-P 18:66] and a gloss of at least 8% [TAPPI T 480] All parameters measured on the dispersion coated print side of the paperboard.

The grammage of the dispersion barrier layer or layers is preferably between 10-30 gsm, more preferably between 10-20 gsm. In embodiments wherein a first and a second dispersion barrier layer is applied on the substrate, the grammage of the first layer is preferably between 5-15 gsm, more preferably between 5-10 gsm, and the grammage of the second layer around 5-15 gsm, more preferably between 5-10 gsm. In embodiments wherein only one dispersion barrier layer is applied on the first side of the substrate, the grammage of said dispersion barrier layer may be between 5-15 gsm.

The method of producing the inventive paperboard comprises applying at least one dispersion barrier layer on the paperboard substrate, forming a dispersion coated substrate and drying said dispersion coated substrate. In one embodiment, the fiber-based substrate has a first moisture content prior to the application of the at least one dispersion barrier layer, and a second moisture content after the drying of the dispersion coated substrate, wherein the difference between said first and second moisture content is less than 2 weight %, preferably less than 1 weight %. In this way, the cracking tendency is diminished.

The dispersion coating is preferable applied by the use of roller coating, spray coating, curtain, blade coating, slot coating, immersion coating, gravure roll coating, reverse direct gravure coating, rod coating, soft-tip blade coating and/or combinations thereof. Preferred coating method involves the use of a rod coater or a soft-tip blade coater. These techniques provide an improved coverage which further enhances the barrier properties. The dispersion coating is preferable applied on-line in a paper or board machine. The coating is preferably applied on-line on a hot web. In one embodiment, the web has a temperature of at least 60° C., preferably above 70° C., at the application of the dispersion coating. In this way, the film formation is improved which gives rise to improved barrier properties. Moreover, in this way the coating is immobilized on the surface of the web much quicker.

The solid content of the dispersion coating may be between 25-70% by weight. The viscosity of the dispersion used for dispersion coating is preferable between 500-1000 mPas. However, the dispersion may be diluted with water or any other solvent in order to achieve the desired viscosity.

The invention further relates to a package for liquid and/or frozen food comprising the paperboard according to the invention. The package is preferably made by use of heat-sealing.

In the embodiment wherein the second side is provided with an extrusion polymer layer, said polymer coated second side may form an inner surface of the thereof formed package and the dispersion coated first side may form an outer/printing surface.

In the embodiment wherein the second side is provided with at least one barrier dispersion layer, said dispersion coated second side may form an inner surface of the thereof formed package and the dispersion coated first side may form an outer/printing surface.

Further features of the present invention will become apparent from the examples and FIGURES, wherein:

FIG. 1 is a schematic drawing of a packaging material according to an embodiment of the invention.

The paperboard shown in FIG. 1 comprises a fiber based substrate 1, comprising three plies, a top ply 1a, a middle ply 1b and a back ply 1c. The top ply 1a of the paperboard is coated with a first dispersion barrier layer 2, wherein the first dispersion barrier layer 2 comprises latex to an amount of between 30-50 weight % and a pigment chosen from the group of clay and calcium carbonate to an amount of 50-70 weight %. A second dispersion barrier layer 3 is arranged on the first barrier layer 2, wherein the second dispersion barrier layer also comprises latex to an amount of between 30-50 weight % and a pigment chosen from the group of clay and calcium carbonate to an amount of 50-70 weight %. The dispersion barrier layers are brought by dispersion barrier coating onto the paperboard substrate. The paperboard shown in FIG. 1 further comprises a polymer coating (4) applied on the back ply. The polymer coating is preferably extrusion coated onto the paperboard substrate. The paperboard as shown in FIG. 1 is particularly suitable for heat-sealed packages for liquid and/or frozen food. The paperboard may be printed directly on the outermost barrier layer (3). In the thereof formed package, the polymer layer (4) forms the inner side to be in contact with the content, preferably liquid and/or frozen food

EXAMPLE

A trial was performed to evaluate the barrier properties of the paperboard of the invention.

An uncoated paperboard substrate, Cupforma Natura™, 214 g/m², comprising a top layer of sulphate pulp, a middle layer of sulphate pulp and CTMP and a back layer of sulphate pulp, was dispersion coated on its first side with two dispersion barrier layer (1+2) with the aid of a roll and a rod coater. The second layer was applied on the first layer. The grammage of the first layer (layer 1) was 10 gsm and of the second layer (layer 2) 5 gsm. The dispersion coating compositions were prepared according to table 1. The sheets were thereafter dried to achieve a moisture content of around 7%.

TABLE 1

| Raw material | Dispersion 1 [%, dry weight] | Dispersion 2 [%, dry weight] |
| --- | --- | --- |
| SA Latex | 71 | 40.6 |
| Calcium Carbonate pigment | 28.5 | 58 |
| NaOH | 0.2 | 0.1 |
| Thickener | 0.3 | 0.1 |
| Disp agent | — | 0.1 |
| Co-binder (PVOH) | | 0.3 |
| Lubricant (Stearate) | | 0.4 |
| Cross-linker (Ammonium Zirconium Carbonate (AZC) | | 0.4 |

The sheets was further extrusion coated with polyethylene (PE) (15 gsm), on the inner, second side, of the paperboard substrate.

Results:

The properties of the paperboard coated with said dispersion 1 (forming a first layer) and dispersion 2 (forming a second layer) is summarized in table 2. All properties are measured on the outer/print-side, i.e. on the first side which is dispersion barrier coated in accordance with the invention.

TABLE 2

| Trial # | Brightness [%], ISO 2470 | WVTR [g/m2] | COBB3600 [g/m2], 100 cm2 | Contact angle [degrees] | Gloss [TAPPI T 480] |
| --- | --- | --- | --- | --- | --- |
| 1 | 81.9 | 5 | 5 | 110 | 8.5 |

As can be seen in table 2 from the brightness and gloss values, the substrate dispersion coated in accordance with the invention provided a paperboard with good optical properties. The WVTR, COBB and contact angle values further show that the paperboard provided a good moisture barrier, well enough to endure moisture arising from condensation.

The invention claimed is:

1. A paperboard for packaging of liquid and/or frozen food, the paperboard comprising:
 a fiber based substrate, which comprises a first side and a second side, and
 at least one dispersion barrier layer applied on said first side, wherein the at least one dispersion barrier layer forms a printing surface,
 wherein said dispersion barrier layer comprises latex in an amount between 30-50 wt % and a pigment chosen from the group of kaolin clay and calcium carbonate in an amount between 50-70 wt %, all wt % calculated on a dry weight of said dispersion barrier layer.

2. The paperboard according to claim 1, wherein the fiber based substrate is surface sized on said first side and wherein the at least one dispersion barrier layer is applied on said surface sized fiber based substrate.

3. The paperboard according to claim 1, wherein the paperboard further comprises a polymer layer applied on the second side.

4. The paperboard according to claim 3, wherein the polymer layer is formed from foamed polymer.

5. The paperboard according to claim 1, wherein the at least one dispersion coating layer further comprises a cross-linker in an amount between 0.1-5 wt %.

6. The paperboard according to claim 1, wherein the pigment is kaolin clay.

7. The paperboard according to claim 1, wherein the pigment is calcium carbonate.

8. The paperboard according to claim 1, wherein a first dispersion barrier layer and a second dispersion barrier layer are both applied on the first side.

9. The paperboard according to claim 8, wherein the first dispersion layer comprises latex and kaolin clay, and wherein the second dispersion barrier layer comprises latex and calcium carbonate.

10. The paperboard according to claim 1, wherein the at least one dispersion barrier layer is the only barrier layer applied on the first side, and where the at least dispersion barrier layer forms the printing surface.

11. The paperboard according to claim 1, wherein the paperboard exhibits a brightness of at least 70% and a Water Vapor Transfer Rate (WVTR) of less than 10 g/m² per day.

12. The paperboard according to claim 1, wherein the paperboard exhibits a water absorption rate between 1-6 g/m², as measured using COBB 3600.

13. A method to produce a paperboard, comprising the steps of:
 providing a fiber-based substrate comprising at least two plies and having a first and a second side,
 applying at least one dispersion barrier layer on the first side, forming a dispersion coated substrate, drying said dispersion coated substrate, and wherein the at least one dispersion barrier layer comprises latex in an amount between 30-50 wt % and a pigment chosen from the group of kaolin clay and calcium carbonate in an amount between 50-70 wt %, all wt % calculated on a dry weight of said dispersion barrier layer.

14. The method according to claim 13, wherein the fiber-based substrate has a first moisture content prior to the application of the at least one dispersion barrier layer, and a second moisture content after the drying of the dispersion coated substrate, wherein the difference between said first and second moisture content is less than 2 wt %.

15. The method according to claim 13, comprising the steps of applying both a first dispersion barrier layer and a second dispersion barrier layer on the first side of the substrate.

16. The method according to claim 13, wherein the method further comprises the step of applying a polymer layer on said second side.

17. The method according to claim 16, wherein said polymer layer is applied by foam coating.

18. A packaging for a liquid and/or frozen food comprising:

the paperboard according to claim 3, wherein the polymer coated second side forms an inner surface of the package and the dispersion coated first side forms an outer/printing surface.

19. The packaging according to claim 18, wherein the outer/printing surface further comprises ink printed onto said dispersion barrier layer.

* * * * *